United States Patent [19]

Riedinger et al.

[11] Patent Number: 5,024,398
[45] Date of Patent: Jun. 18, 1991

[54] OFFICE MODULE FOR PASSENGER AIRCRAFT

[75] Inventors: Thomas R. Riedinger, Mercer Island; Thomas H. White, Issaquah, both of Wash.

[73] Assignee: The Boeing Company, Seattle, Wash.

[21] Appl. No.: 372,535

[22] Filed: Jun. 28, 1989

[51] Int. Cl.$^5$ .......................................... B64D 11/00
[52] U.S. Cl. ................................................ 244/118.5
[58] Field of Search ...................... 244/118.5, 118.6; 52/79.1, 79.4, 79.7, 239; 296/24.1; 105/315, 316, 344

[56] References Cited

U.S. PATENT DOCUMENTS

| D. 155,335 | 9/1949 | Delcher, Jr. et al. | D71/1 |
|---|---|---|---|
| D. 155,362 | 9/1949 | Ray | D71/1 |
| D. 155,363 | 9/1949 | Ray et al. | D71/1 |
| 1,313,531 | 8/1919 | Fowler | 105/315 |
| 1,731,531 | 10/1929 | Gott | 244/118.6 |
| 2,092,655 | 9/1937 | Page, Jr. | 244/118.6 |
| 2,134,032 | 10/1938 | Crawford et al. | 105/315 |
| 2,340,839 | 2/1944 | Patton | 105/344 |
| 2,396,039 | 3/1946 | Burton et al. | 244/118.1 |
| 2,589,997 | 3/1952 | Dean et al. | 105/315 |
| 2,632,408 | 3/1953 | Giles | 105/344 |
| 2,681,016 | 6/1954 | Candlin, Jr. | 105/315 |
| 2,710,731 | 6/1955 | Bright et al. | 244/118.6 |
| 2,760,442 | 8/1956 | Murphy | 105/315 |
| 2,914,001 | 11/1959 | Murphy | 105/315 |
| 2,946,294 | 7/1960 | Murphy | 105/315 |
| 3,240,450 | 3/1966 | Skarott | 244/118.5 |
| 3,418,765 | 12/1968 | Propst et al. | 52/239 |
| 3,869,992 | 3/1975 | Kramer | 52/239 |
| 4,055,317 | 10/1977 | Greiss | 244/118.5 |
| 4,066,227 | 1/1978 | Buchsel | 244/118.6 |
| 4,161,914 | 7/1979 | Marsh | 105/344 |
| 4,458,864 | 7/1984 | Colombo et al. | 244/118.5 |
| 4,597,549 | 7/1986 | Ryan | 244/118.5 |

FOREIGN PATENT DOCUMENTS

| 3007733 | 9/1985 | Fed. Rep. of Germany . | |
| 2426608 | 12/1979 | France . | |
| 2024755 | 1/1980 | United Kingdom | 244/118.5 |

OTHER PUBLICATIONS

Shrontz, Frank, "Innovations in Air Travel", Apr. 1987, Alaska Airlines Magazine.

Primary Examiner—Joseph F. Peters, Jr.
Assistant Examiner—Anne E. Bidwell
Attorney, Agent, or Firm—Joan H. Pauly

[57] ABSTRACT

Module sidewalls (14) define an office space adjacent to an aisle (6) in an aircraft passenger cabin. The sidewalls (14) are dimensioned to extend downwardly substantially to the cabin floor (2) and upwardly a distance sufficient to screen the office space. The sidewalls (14) are spaced from the cabin ceiling (4) to allow air circulation and create a feeling of openness. The sidewalls (14) define an entry opening (16), and a recess (20) to allow persons in the aisle (6) to step into the recess (20) out of the way of other persons or carts in the aisle (6). The module (12) includes a seat (22), a desk top (24) and equipment such as a telephone (26) and a computer link. The elements of the module (12) are arranged to maximize elbow room and leg room within a predetermined cabin floor area. Hexagonal modules (12) are arranged in a single continuous row or in two contiguous nested rows between two aisles (6). Side modules (12', 12") are formed partly by the cabin sidewalls (8).

15 Claims, 3 Drawing Sheets

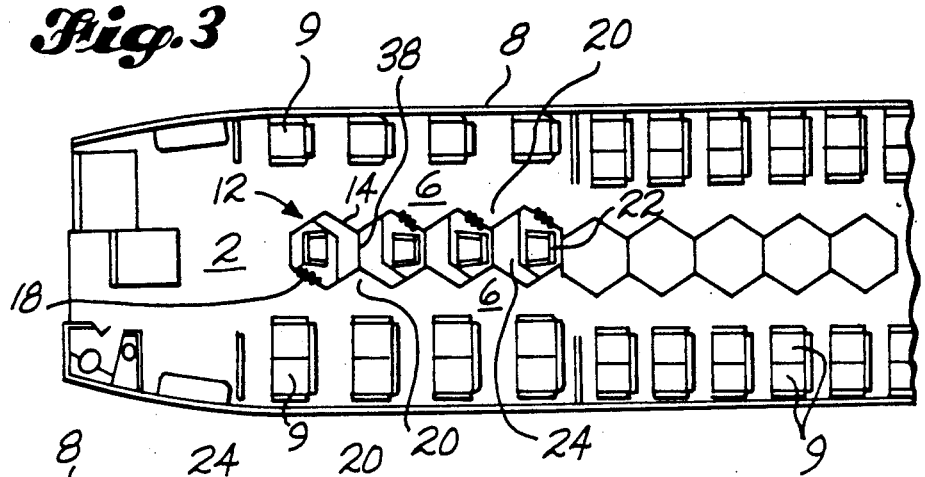
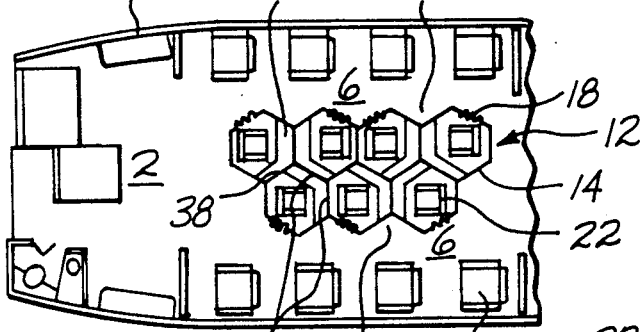
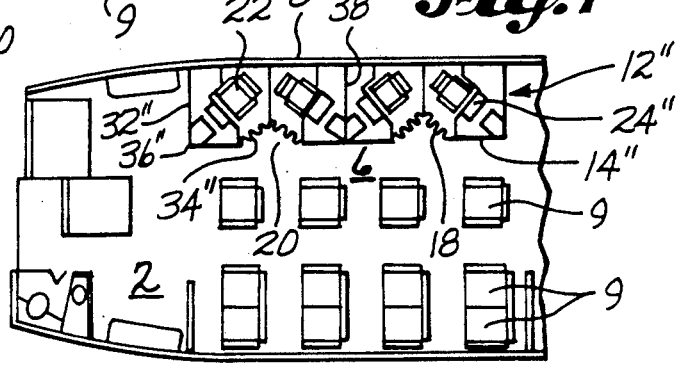
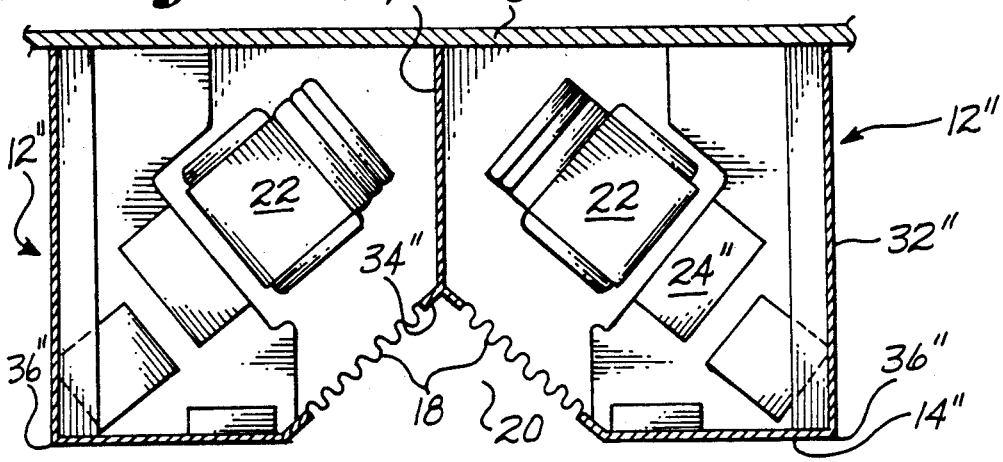

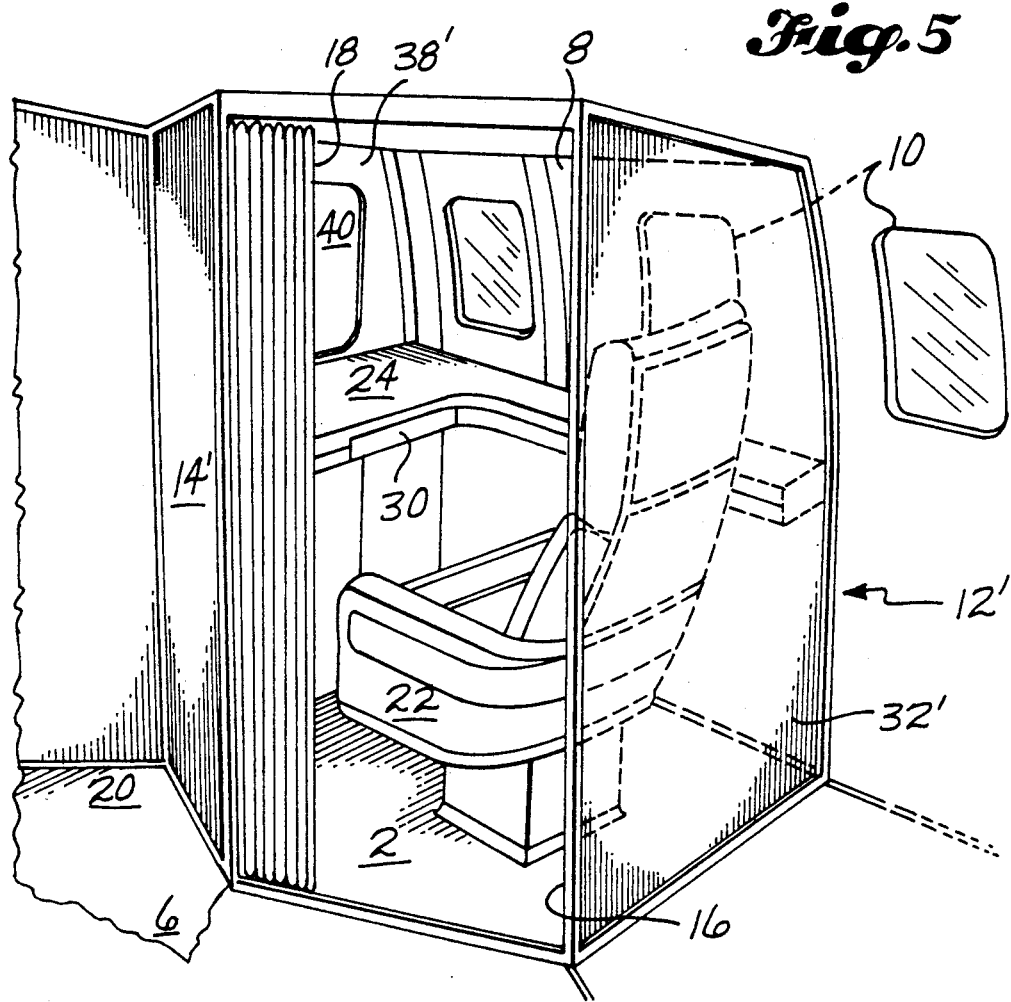
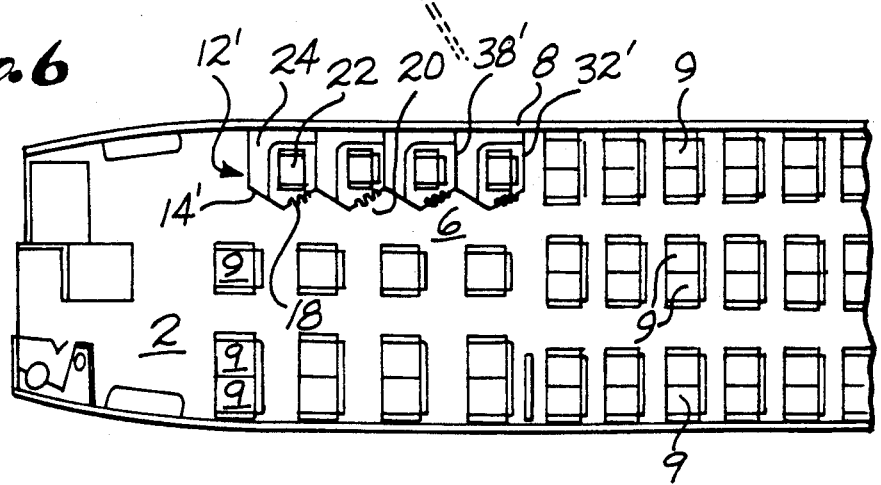

OFFICE MODULE FOR PASSENGER AIRCRAFT

TECHNICAL FIELD

This invention relates to specialized enclosures for aircraft passenger cabins and, more particularly, to such an enclosure that provides private office work space for a passenger that allows free passage of persons and carts on an adjacent aisle, does not require supplementary environmental controls, and maximizes elbow room and leg room for comfortable working while minimizing the cabin floor area occupied by the work space.

BACKGROUND ART

The pace of modern living seems to be ever increasing. Business executives commonly have little, if any, free time but are nevertheless required to travel frequently. At times, a business trip must be scheduled with very short notice. Therefore, there is a need for business executives and others with high work loads and travel requirements to be able to work effectively while en route between travel destinations. A high proportion of travel time is spent on aircraft. Presently available aircraft accommodations are not satisfactory for accomplishing many types of work, particularly work of a confidential nature which requires some privacy.

The patent literature includes a number of examples of special purpose areas in passenger aircraft. U.S. Pat. No. Des. 155,335, granted Sept. 27, 1949, to H. C. Delcher, Jr. et al., discloses a design for a lavatory. A hostess station or galley is disclosed in U.S. Design Pat. No. 155,362, granted Sept. 27, 1949, to C. T. Ray, and U.S. Pat. No. 4,055,317, granted Oct. 25, 1977, to R. S. Greiss. U.S. Design Pat. No. 155,363, granted Sept. 27, 1949, to C. T. Ray et al. discloses a design for a passenger lounge. Sleeping areas are disclosed in U.S. Pat. Nos. 1,731,531, granted Oct. 15, 1929, to E. N. Gott, and No. 2,092,655, granted Sept. 7, 1937, to G. A. Page, Jr., and in West German Patent Application Specification No. 3,007,733, published Sept. 10, 1981. A mezzanine seating area is disclosed in U.S. Pat. No. 4,066,227, granted Jan. 3, 1978, to C. K. E. Buchsel. Structures for transporting and treating medical patients are disclosed in U.S. Pat. No. 4,458,864, granted July 10, 1984, to A. Colombo et al., and French Patent Application No. 78 15402, made public on Dec. 21, 1979.

Movable partitions or bulkheads for aircraft cabins are disclosed in U.S. Pat. Nos. 2,396,039, granted Mar. 5, 1946, to E. F. Burton et al.; No. 2,710,731, granted June 14, 1955, to H. E. Bright et al.; and No. 4,597,549, granted July 1, 1986, to J. M. Ryan. A baggage holder arrangement for private aircraft is disclosed in U.S. Pat. No. 3,240,450, granted Mar. 15, 1966, to E. E. Skarott.

There are also a number of examples in the patent literature of arrangements for railroad passenger cars. Passenger compartment arrangements are disclosed in U.S. Pat. Nos. 1,313,531, granted Aug. 19, 1919, to J. O. Fowler; No. 2,134,032, granted Oct. 25, 1938, to D. A. Crawford et al.; No. 2,681,016, granted June 15, 1954, to J. E. Candlin, Jr.; No. 2,914,001, granted Nov. 24, 1959, to G. K. Murphy; No. 2,946,294, granted July 26, 1960, to G. K. Murphy; and No. 4,161,914, granted July 24, 1979, to R. W. Marsh. A washroom arrangement is shown in U.S. Pat. No. 2,340,839, granted Feb. 1, 1944, to J. W. Patton. A car with a double-deck center section is disclosed in U.S. Pat. No. 2,589,997, granted Mar. 18, 1952, to W. B. Dean et al. Enclosable seating that converts to sleeping surfaces is disclosed in U.S. Pat. No. 2,632,408, granted Mar. 24, 1953, to E. M. Giles.

In the last cited Giles patent, the enclosable seats are arranged at an angle to the sides of the car. This arrangement is described as providing reclining space and privacy without appreciable reduction in seating capacity. The seats recline into sleeping surfaces. A curtain mounted on an overhead track may be pulled to enclose an individual seat or a group of seats. The closed curtains extend between the seats and along the aisle.

In the Candlin, Jr. patent, the railroad compartments are arranged in pairs along a passageway. There is a movable partition between the two compartments in each pair to permit conversion into a suite. The doors to each compartment and the adjacent compartment of the adjacent pair of compartments open onto an alcove in the passageway wall. A linen locker also opens onto the alcove to permit an attendant to have access to the locker while standing clear of the passageway. The alcove also allows persons to enter and exit the compartments without impeding the passageway.

The above patents and the prior art discussed and/or cited therein should be considered for the purpose of putting the present invention into proper perspective relative to the prior art.

DISCLOSURE OF THE INVENTION

The subject of the invention is an office module for use in an aircraft passenger cabin having a floor, a ceiling, and an aisle. According to an aspect of the invention, the module comprises sidewalls positionable to define an office space adjacent to the aisle. The sidewalls are dimensioned to extend downwardly at least substantially to the floor of the cabin and upwardly a distance sufficient to screen the space from persons outside the space. The sidewalls are also dimensioned to be spaced from the ceiling a distance sufficient to allow circulation of air into and out from the office space. An opening is provided in the sidewalls to permit entry into and exit from the office space from and to the aisle. The sidewalls define a recess to permit a person to step out of the aisle into the recess to allow a cart or another person to pass without intruding into the office space. The module also includes a seat mountable on the cabin floor inside the office space, and a desk top carried by inside portions of the sidewalls and positioned to be used by an occupant of the seat. The sidewalls and the office space are configured, and the seat and the desk top are positioned, to maximize elbow room and leg room for the occupant of the seat within a predetermined floor area occupied by the office space. Preferably, the module includes an openable closure for the opening in the sidewalls to provide privacy for the occupant.

The module is preferably provided with equipment of the type which is commonly needed by working executives and others doing similar work. For example, a telephone is preferably mounted for use by the occupant for communication with ground locations. Other examples are a video system mounted for use by the occupant, and means for linking a computer with sources of data on the ground. The latter feature would enable an occupant with a lap top computer to accomplish a wide variety of computer related tasks.

Various plan configurations for the office space accomplish the requirements of comfortable work space with elbow room and leg room within a predetermined floor area. A preferred plan configuration for the office space is a substantially hexagonal configuration. This type of configuration provides maximized elbow room and substantial leg room. It also provides frequent recesses along the aisle without adversely impacting the elbow room and the leg room. When the hexagonal units are positioned in the center of an aircraft between two aisles, the hexagonal configuration provides the recesses on both sides of the office modules on both aisles. The hexagonal configuration also readily lends itself to nesting of two contiguous rows of modules to provide a maximum number of individual office modules in a minimum amount of cabin floor space.

The invention also includes plan configurations which are better suited to office modules positioned along a cabin sidewall. In the case of side units, the module sidewalls are preferably positionable to extend inboardly from sidewall portions of the cabin and to cooperate with the sidewall portions to define the office space. A specific example of such a configuration is a generally rectangular plan configuration with two opposite sides substantially perpendicular to the aisle, a truncated corner adjacent to one of these sides and the aisle and defining the recess, and a substantially square corner adjacent to the other of the sides and the aisle. In this plan configuration, the seat is preferably mounted substantially parallel to the truncated corner, and the desk top is positioned at an acute angle to the sides. This provides extra leg room in the square corner while maintaining substantial elbow room. The side units may also be provided with two truncated corners instead of one truncated corner and a square corner. This reduces the leg room in the office space, but has the advantage of providing more frequent recesses along the aisle.

It is contemplated that the office space modules of the invention will most commonly be provided in groups. According to an aspect of the invention, the modules are arrangeable in a continuous row along the cabin aisle, with each module sharing a common sidewall with each of the modules adjacent thereto. In an arrangement of nested hexagonal office spaces, an individual unit may be adjacent to and share a common sidewall with as many as four other units. Regardless of the exact form of the plan configuration of the office space modules, the feature of an openable panel in the common sidewall between two modules may be provided to permit communication between occupants of the adjacent modules sharing the common sidewall.

Each recess may be formed entirely by a single module. However, it is preferable that each recess be formed by the cooperation of two adjacent modules. Therefore, a preferred feature of the invention is a plan configuration of the modules with a corner portion extending at an acute angle from the aisle to a common sidewall. Each corner portion is adjacent to another corner portion of another module. The adjacent corner portions together define the recess. This preferred feature allows the recesses to be large enough to comfortably step into without adversely affecting the elbow room and leg room in the modules.

The module of the invention solves the problem of the lack of adequate work space, equipment, and privacy for people who need to accomplish productive and important work while on an aircraft. The module of the invention is of relatively simple construction and may be readily installed in and removed from a passenger cabin. The module is very versatile and may be installed in various cabin locations and in groups having various numbers of units. The invention also provides a very high level of comfort for occupants of the work spaces and sufficient equipment to carry out a wide range of tasks while helping to maximize the efficient and economical use of the floor space available in the aircraft cabin. The dimensioning of the height of the module sidewalls allows the cabin environmental control system to service the module and, thus, avoids any need for a supplemental system. It also helps maintain a sense of openness to prevent feelings of claustrophobia on the part of module occupants and passengers in other portions of the cabin.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 3 is a plan view of the cabin arrangement shown in FIG. 2.

FIG. 4 is a partial plan view of the cabin shown in FIGS. 2 and 3 showing a modified arrangement of the seats and office modules.

FIG. 5 is a pictorial view of a second preferred embodiment of the module.

FIG. 6 is a plan view of a cabin showing an arrangement of modules of the type shown in FIG. 5.

FIG. 7 is like FIG. 6 except that it shows a third preferred embodiment of the module.

FIG. 8 is an enlarged plan view of two of the modules shown in FIG. 7.

BEST MODES FOR CARRYING OUT THE INVENTION

Figure 1:
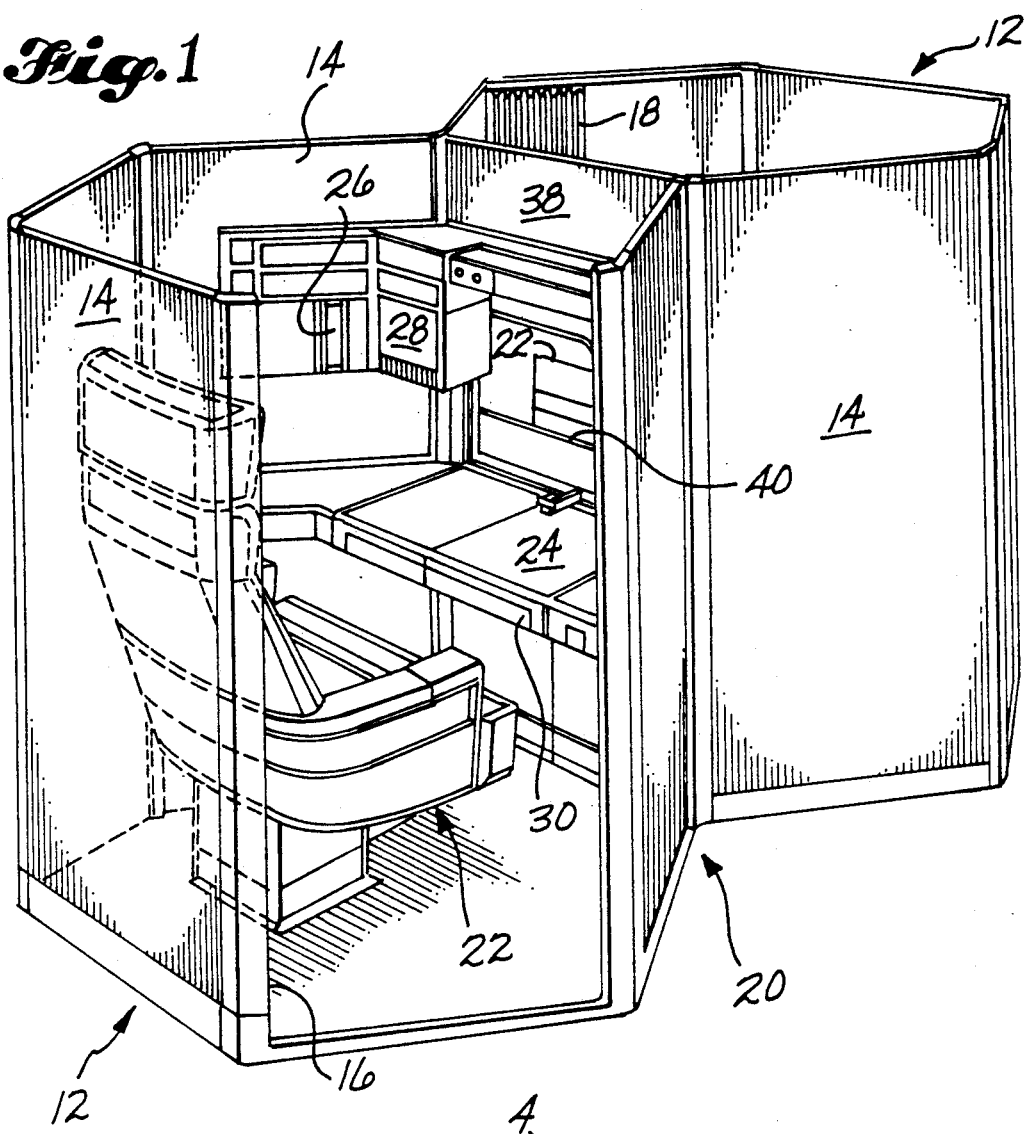
FIG. 1 is a pictorial view of two units of a first preferred embodiment of the module of the invention.

The drawings show office modules 12, 12', 12" that are constructed according to the invention and that also constitute the best modes of the invention currently known to the applicants. In the drawings, various installation configurations of groups of modules are shown in a typical aircraft passenger cabin. It is anticipated that in most situations the modules of the invention will be installed in the types of patterns shown in the drawings. However, it is of course to be understood that the modules may also be installed in other patterns of groups of modules or individually, and in other types of aircraft cabins, without departing from the spirit and scope of the invention.

Referring to FIGS. 2-7, the illustrated aircraft passenger cabin has the usual basic structure. The structure includes a floor 2, a ceiling 4, and sidewalls 8. Conventional passenger seats 9 are arranged along aisles 6. The sidewalls 8 have conventional windows 10. As is customary, the cabin is divided into a forward first class compartment and an aft coach class compartment, shown on the left and right, respectively, of FIGS. 3 and 6. FIGS. 4 and 7 show the forward first class section of the cabin.

A first preferred embodiment 12 of the module of the invention is shown in FIGS. 1-4. The module 12 includes sidewalls 14 that define an office space. The sidewalls 14 are preferably dimensioned so that the office space will fit into space cleared by the removal of a conventional seat or seats 9. It is also preferable that the sidewalls 14 carry means for anchoring them to the standard tracks which are included in the cabin floor 2 for securing the seats 9. The securing of the sidewalls 14 may be accomplished by a variety of conventional means. The positioning of the modules 12 at locations cleared by the removal of seats 9 facilitates their location adjacent to an aisle 6. The sidewalls 14 are provided with a door or opening 16 to permit entry into and exit from the office space from and to the aisle 6. Preferably, the module 12 includes an openable closure for the access opening 16 to provide privacy for the occupant of the office space. One suitable type of closure is the curtain 18 shown in FIGS. 1 and 5.

The height of the sidewalls 14 is chosen to provide privacy for the occupant of the office space while allowing the space to be serviced by the main cabin environmental control system and maintaining a feeling of openness in the cabin. The sidewalls 14 are dimensioned to extend downwardly at least substantially to the floor 2 of the cabin and upwardly a distance sufficient to screen the office space from persons outside the space. This dimensioning secures the privacy of the occupant of the office space. The sidewalls 14 are also dimensioned to be spaced from the cabin ceiling 4 a distance sufficient to allow circulation of air into and out from the office space and to maintain a feeling of openness. The preferred height of the sidewalls 14 is just high enough to be above the eye level of most passengers.

A recess 20 is defined by the module sidewalls 14 along the aisle 6. This permits a person in the aisle 6 to step out of the aisle 6 into the recess 20 to allow a cart or another person to pass without intruding into the office space. Thus, the recess 20 safeguards the privacy of the occupant of the office space. In addition, the recesses 20 formed by the modules 12 tend to increase rather than decrease use of the aisles 6 by the passengers in the cabin and, therefore, help to prevent the passengers in the conventional seats 9 from viewing the office modules 12 as an intrusion into the cabin.

The module 12 also includes a seat 22 that is mountable on the cabin floor 2 inside the office space. Like the sidewalls 14, the seat 22 is preferably securable to the standard seat tracks by conventional means. A spacious and sturdy desk top 24 is carried by inside portions of the sidewalls 14. As shown in FIGS. 1, 3, and 4, the desk top 24 is positioned to be used by an occupant of the seat 22. The configuration of the sidewalls 14 and the office space defined thereby and the positioning of the seat 22 and desk top 24 is chosen to maximize elbow room and leg room for the occupant of the office space within a predetermined floor area occupied by the office space. Preferably, the predetermined floor area is chosen to minimize the reduction in the total number of seats 9, 22 in the cabin caused by the replacement of some of the conventional seats 9 by office modules 12.

The office module of the invention is preferably equipped with a number of devices to enable an occupant to accomplish many of the tasks which are normally carried out in a standard ground-located office. FIG. 1 illustrates a convenient arrangement of such devices The illustrated arrangement includes a telephone 26 and a video monitor 28. Both of these devices 26, 28 are mounted for ready use by an occupant of the seat 22. The telephone 26 enables the occupant to communicate with various ground locations. Preferably, the video monitor 28 is part of a video system that provides entertainment, in-flight messages, and other telecommunications. It may also serve as a computer monitor. In order to reduce the tendency of in-flight messages to distract the occupant, the messages may be displayed on a relatively small corner portion of the monitor screen 28. The module 12 preferably includes means for linking a computer with sources of data on the ground. This means may conveniently be incorporated into either the telephone unit 26 or the monitor unit 28. The computer may be provided either by the airline or by the occupant. Other amenities which may be included in a module 12 are an alternating current electrical outlet and a space or hook for hanging clothes. The desk top 24 may have a drawer 30 for small office items, such as a stapler.

Figure 2:
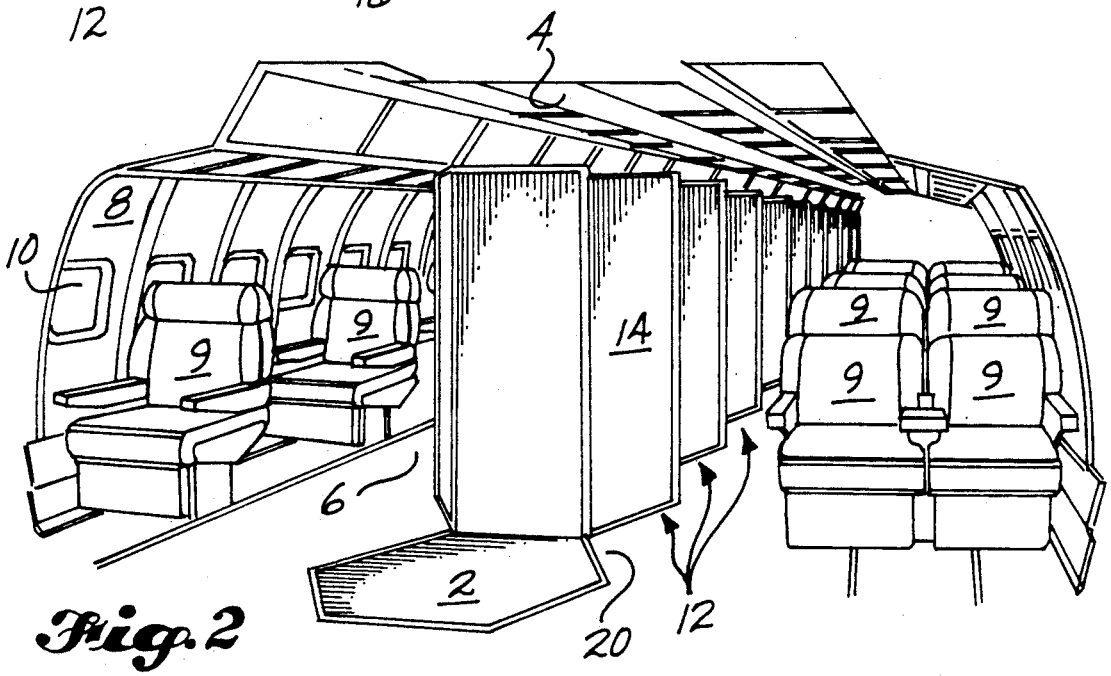
FIG. 2 is a pictorial view of a row of modules of the type shown in FIG. 1 installed in an aircraft cabin.

In the preferred embodiment shown in FIGS. 1-4, the module 12 has a hexagonal plan configuration. This configuration is highly suitable to modules installed between two aisles 6 in an aircraft cabin since it readily forms recesses 20 on each of the aisles 6. The hexagonal configuration also tends to maximize the elbow room and leg room inside the module 12 for a given amount of cabin floor space. As shown in FIGS. 2-4, the modules 12 are arranged with two of the sides of the hexagon perpendicular to the adjacent aisle or aisles 6. The modules 12 are arranged in a continuous row along the aisle or aisles 6, with each module 12 sharing a common sidewall 38, perpendicular to the aisle 6, with each of the modules 12 adjacent thereto. This creates two opposite truncated corner portions of the module 12 along the aisle 6 extending at an acute angle from the aisle 6 to the opposite common sidewalls 38 shared with the adjacent modules 12. Each of these corner portions is adjacent to another corner portion of the adjacent module 12 so that the adjacent corner portions together define a recess 20. This configuration provides a recess between each pair of adjacent modules 12, or, in other words, a recess 20 adjacent to each of the common sidewalls 38. The frequent recesses 20 along the aisle 6 do not adversely affect elbow room inside the modules 12. The apex where the corner portions meet provides ample elbow room.

FIGS. 1-3 show a plurality of modules 12 arranged in a single row. As shown in FIGS. 2 and 3, this single row is conveniently positioned between two cabin aisles 6. FIG. 4 shows a double row of modules 12. The modules 12 in FIG. 4 are arranged in two continuous contiguous rows between two aisles 6. In order to minimize the cabin floor space occupied by the modules 12, the modules 12 are nested together in contiguous rows so that each module 12 shares a common sidewall 38 with each of the modules adjacent thereto. For the endmost modules 12, a first common sidewall 38 is shared with the adjacent module 12 in the same row, and a second common sidewall 38 is shared with an adjacent module 12 in the adjacent row. Other modules 12 in the arrangement share common sidewalls 38 with each of two other modules 12 in the same row and/or with each of two adjacent modules 12 in the adjacent row.

FIG. 1 illustrates another feature of the invention. This feature is an openable panel 40 in a common sidewall 38. This panel 40 can be lowered much in the manner of a pocket door to permit communciation between occupants of the adjacent modules 12 sharing the common sidewall 38. The panel 40 may also be raised into its closed position, shown in FIG. 5, to provide privacy for the occupants of both modules 12. FIG. 1 shows the panel 40 in an open position. As illustrated, the panel 40 is provided in the common sidewall 38 above the desk top 24. It may also be provided in the other common sidewalls 38, with one or more panels 40 being included in each module 12.

FIGS. 5-8 show two other embodiments 12', 12" of the module of the invention which are designed to be positioned along the cabin sidewalls 8. In each of these embodiments, the sidewalls 14', 14" of the modules 12', 12" are positionable to extend inboardly from a cabin sidewall 8. The sidewalls 14', 14" include inboardly extending portions 32', 32" and portions adjacent to the aisle 6. The sidewalls 14', 14" cooperate with the cabin sidewalls 8 to define the office space.

Like the hexagonal module 12 shown in FIGS. 1-4, the modules 12', 12" are preferably arranged in continuous rows along a cabin aisle 6, in this case the aisle 6 nearest the cabin sidewall 8. Each module 12', 12" shares a common sidewall 38', 38" with each module 12', 12" adjacent thereto. Each module 12', 12" has a corner portion that extends at an acute angle from the aisle 6 to a common sidewall 38', 38" to form a recess 20 with an adjacent corner portion of an adjacent module 12', 12" in the same manner as adjacent corner portions form recesses 20 in the embodiment shown in FIGS. 1-4.

Referring to FIGS. 5 and 6, the second preferred embodiment of the module 12' has a configuration with an inboard portion substantially the same as the hexagonal configuration shown in FIGS. 1-4. The outboard portion of module 12' is modified to conform to the cabin sidewall 8. As shown in FIG. 5, the module 12' may be arranged so that the occupant has a comfortable view through one of the cabin windows 10.

The third preferred embodiment of the module 12" is shown in FIGS. 7 and 8. The module 12" has a generally rectangular plan configuration with two opposite sides 32" substantially perpendicular to the aisle 6. The module 12" has two corners 34", 36" adjacent to the aisle 6 and the respective perpendicular sides 32". One corner 34" is truncated and defines, with the adjacent truncated corner 34" of the adjacent module 12", the recess 20. The other corner 36" is substantially square. In this module 12", the seat 22 is mounted substantially parallel to the truncated corner 34". The desk top 24" is positioned at an acute angle to the perpendicular sides 32". This arrangement provides maximized leg room for the seat occupant in the square corner 36".

Each of the embodiments of the invention provides a comfortable and convenient work space to enable an occupant to work in private free from disruptions The desk top 24, 24" provides sufficient work space to open a briefcase and remove or replace materials comfortably and to spread out papers and other work items. The module design allows the occupant to easily stow a briefcase or other item in a position in which it is readily accessible without disturbing others. The privacy provided by the module 12, 12', 12" protects the confidentiality of the work materials and also helps to enhance the concentration of the occupant by eliminating distractions. The desk top 24, 24" preferably pivots into a nonuse position to allow the occupant to stretch out and relax. The module 12, 12', 12" may also be provided with lighting under the full control of the occupant to further enhance the work environment.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. An office module for use in an aircraft passenger cabin having a floor, a ceiling, and an aisle, said module comprising:

sidewalls positionable to define an office space adjacent to said aisle; said sidewalls being dimensioned to extend downwardly at least substantially to said floor of the cabin and upwardly a distance sufficient to screen said space from persons outside said space, and to be spaced from said ceiling a distance sufficient to allow circulation of air into and out from said space; said sidewalls having an opening therein to permit entry into and exit from said space from and to said aisle; and said sidewalls defining a recess to permit a person to step out of said aisle into said recess to allow a cart or another person to pass without intruding into said office space;

a seat mountable on said floor inside said space; and a desk top carried by inside portions of said sidewalls and positioned to be used by an occupant of said seat;

said sidewalls and said space being configured, and said seat and said desk top being positioned, to maximize elbow room and leg room for said occupant within a predetermined floor area occupied by said space.

2. The module of claim 1, further comprising an openable closure for said opening to provide privacy for said occupant.

3. The module of claim 1, further comprising a telephone mounted for use by said occupant for communication with ground locations.

4. The module of claim 1, further comprising a video system mounted for use by said occupant.

5. The module of claim 1, further comprising means for linking a computer with sources of data on the ground.

6. The module of claim 1, in which said sidewalls are positionable to extend inboardly from sidewall portions of the cabin and to cooperate with said sidewall portions to define said office space.

7. A plurality of modules as described in claim 1 arrangeable in a continuous row along said aisle, with each said module sharing a common sidewall with each of said modules adjacent thereto.

8. A plurality of .modules as described in claim 7, in which at least one said common sidewall has an openable panel therein to permit communication between occupants of the adjacent modules sharing said common sidewall.

9. A plurality of modules as described in claim 7, in which each said module has a plan configuration with a corner portion extending at an acute angle from said aisle to one of said common sidewalls; each said corner portion being adjacent to another said corner portion of another said module to define therewith said recess.

10. A plurality of modules as described in claim 9, in which a recess is defined by adjacent corner portions of said modules adjacent to each said common sidewall.

11. An office module for use in an aircraft passenger cabin having a floor, a ceiling, and an aisle, said module comprising:

sidewalls positionable to define an office space adjacent to said aisle; said sidewalls being dimensioned to extend downwardly at least substantially to said floor of the cabin and upwardly a distance sufficient to screen said space from persons outside said space, and to be spaced form said ceiling a distance sufficient to allow circulation of air into and out from said space; said sidewalls having an opening therein to permit entry into and exit from said space from and to said aisle; and said sidewalls defining a recess to permit a person to step out of said aisle into said recess to allow a cart or another person to pass without intruding into said office space;

a seat mountable on said floor inside said space; and a desk top carried by inside portions of said sidewalls and positioned to be used by an occupant of said seat;

said sidewalls and said space being configured, and said seat and said desk top being positioned, to maximize elbow room and leg room for said occupant within a predetermined floor area occupied by said space; and said sidewalls having a substantially hexagonal plan configuration.

12. An office module for use in an aircraft passenger cabin having a floor, a ceiling, and an aisle, said module comprising:

sidewalls positionable to define an office space adjacent to said aisle; said sidewalls being dimensioned to extend downwardly at least substantially to said floor of the cabin and upwardly a distance sufficient to screen said space from persons outside said space, and to be spaced form said ceiling a distance sufficient to allow circulation of air into and out from said space; said sidewalls having an opening therein to permit entry into and exit from said space from and to said aisle; and said sidewalls defining a recess to permit a person to step out of said aisle into said recess to allow a cart or another person to pass without intruding into said office space;

a seat mountable on said floor inside said space; and a desk top carried by inside portions of said sidewalls and positioned to be used by an occupant of said heat;

said sidewalls and said space being configured, and said seat and said desk top being positioned, to maximize elbow room and leg room for said occupant within a predetermined floor area occupied by said space;

said sidewalls being positionable to extend inboardly from sidewall portions of the cabin and to cooperate with said sidewall portions to define said office space; and said space having a generally rectangular plan configuration with two opposite sides substantially perpendicular to said aisle, a truncated corner adjacent to one of said sides and said aisle and defining said recess, and a substantially square corner adjacent to the other of said sides and said aisle; and said seat being mountable substantially parallel to said truncated corner, and said desk top being positioned at an acute angle to said sides, to provide leg room for said occupant in said square corner.

13. A plurality of office modules for use in an aircraft passenger cabin having a floor, a ceiling, and an aisle, each said module comprising:

sidewalls positionable to define an office space adjacent to said aisle; said sidewalls being dimensioned to extend downwardly at least substantially to said floor of the cabin and upwardly a distance sufficient to screen said space from persons outside said space, and to be spaced form said ceiling a distance sufficient to allow circulation of air into and out form said space; said sidewalls having an opening therein to permit entry into and exit from said space from and to said aisle; and said sidewalls defining a recess to permit a person to step out of said aisle into said recess to allow a cart or another person to pass without intruding into said office space;

a seat mountable on said floor inside said space; and a desk top carried by inside portions of said sidewalls and positioned to be used by an occupant of said seat;

said sidewalls and said space being configured, and said seat and said desk top being positioned, to maximize elbow room and leg room for said occupant within a predetermined floor area occupied by said space;

in which said modules are arrangeable in a continuous row along said aisle, with each said module sharing a common sidewall with each of said modules adjacent thereto; each said module has a plan configuration with a corner portion extending at an acute angle from said aisle to one of said common sidewalls, each said corner portion being adjacent to another said corner portion of another said module to define therewith said recess; a recess is defined by adjacent corner portions of said modules adjacent to each said common sidewall; and each said module has a substantially hexagonal plan configuration.

14. A plurality of office modules for use in an aircraft passenger cabin having a floor, a ceiling, and an aisle, each said module comprising:

sidewalls positionable to define an office space adjacent to said aisle; said sidewalls being dimensioned to extend downwardly at least substantially to said floor of the cabin and upwardly a distance sufficient to screen said space from persons outside said space, and to be spaced form said ceiling a distance sufficient to allow circulation of air into and out from said space; said sidewalls having an opening therein to permit entry into and exit from said space from and to said aisle; and said sidewalls defining a recess to permit a person to step out of said aisle into said recess to allow a cart or another person to pass without intruding into said office space;

a seat mountable on said floor inside said space; and a desk top carried by inside portions of said sidewalls and positioned to be used by an occupant of said seat;

said sidewalls and said space being configured, and said seat and said desk top being positioned, to maximize elbow room and leg room for said occupant within a predetermined floor area occupied by said space; and said modules being arrangeable in two continuous contiguous rows between said aisle and a second aisle, with each said module sharing a common sidewall with each of said modules adjacent thereto.

15. A plurality of modules as described in claim 14, in which each said module has a substantially hexagonal plan configuration.

* * * * *

UNITED STATES PATENT AND TRADEMARK OFFICE
CERTIFICATE OF CORRECTION

PATENT NO.  : 5,024,398
DATED       : June 18, 1991
INVENTOR(S) : Thomas R. Riedinger and Thomas H. White It is certified that error appears in the above-identified patent and that said Letters Patent is hereby corrected as shown below:

Col. 5, line 61, there is a period after "devices".

Col. 7, line 48, there is a period after "disruptions".

Claim 8, col. 8, line 49, delete "." before "modules".

Claim 11, col. 9, line 3, "form" should be -- from --.

Claim 12, col. 9, line 31, "form" should be -- from --.

Claim 12, col. 9, line 43, "heat" should be -- seat --.

Claim 13, col. 10, in line 3 and again in line 5, "form" should be -- from --.

Claim 14, col. 10, line 42, "form" should be -- from --.

Signed and Sealed this

Twenty-seventh Day of October, 1992

Attest:

DOUGLAS B. COMER

Attesting Officer     Acting Commissioner of Patents and Trademarks